United States Patent [19]

Yonezu et al.

[11] Patent Number: 4,841,440

[45] Date of Patent: Jun. 20, 1989

[54] CONTROL PROCESSOR FOR CONTROLLING A PERIPHERAL UNIT

[75] Inventors: Kazuya Yonezu; Keiji Matsumoto, both of Tokyo, Japan

[73] Assignee: NEC Corporation, Tokyo, Japan

[21] Appl. No.: 604,274

[22] Filed: Apr. 26, 1984

[30] Foreign Application Priority Data

Apr. 26, 1983 [JP]   Japan .................................. 58-73280

[51] Int. Cl.⁴ ............................................... G06F 1/00
[52] U.S. Cl. ................................ 364/200; 364/213.1;
                                                        364/213.3; 364/238.3
[58] Field of Search ... 364/200 MS File, 900 MS File

[56] References Cited

U.S. PATENT DOCUMENTS

| | | | |
|---|---|---|---|
| 4,167,786 | 9/1979 | Miller et al. ........................ | 364/900 |
| 4,231,089 | 10/1980 | Lewine et al. ..................... | 364/200 |
| 4,312,035 | 1/1982 | Greene ................................ | 364/200 |
| 4,371,789 | 2/1983 | Chen et al. ......................... | 364/492 |
| 4,545,030 | 10/1985 | Kitchin ............................... | 364/900 |
| 4,593,349 | 6/1986 | Chase et al. ........................ | 364/200 |
| 4,669,059 | 5/1987 | Little et al. ......................... | 364/900 |
| 4,748,559 | 5/1988 | Smith et al. ........................ | 364/200 |

*Primary Examiner*—Gareth D. Shaw
*Assistant Examiner*—Rebecca L. Rudolph
*Attorney, Agent, or Firm*—Sughrue, Mion, Zinn, Macpeak, and Seas

[57] ABSTRACT

A peripheral control processor for controlling data communication between a host processor and a peripheral unit in response to command signals applied to the host processor. The peripheral control processor has an idle time or a standby condition when data communication is not required. When the peripheral control processor is idle or in a standby condition, a control circuit, within the processor inhibits a control clock signal which activates transistor elements of an internal circuit in the processor. Therefore, unnecessary power consumption is reduced during idle time or a standby condition. Further, the control circuit can produce the inhibition signal by using the command signals used for data communication. Therefore, no new signals or terminals are required for applying input signals to the control circuit.

9 Claims, 5 Drawing Sheets

CONTROL PROCESSOR FOR CONTROLLING A PERIPHERAL UNIT

BACKGROUND OF THE INVENTION

This invention relates to a peripheral control processor which primarily controls information flow between a host processor (CPU) and a peripheral unit (i.e. a display unit, printer, disk, tape, communication unit, modem) and is sometimes called an input-output control processor.

A peripheral control processor is generally used in an information processing system or a data communication system to reduce a host processor's burden, and functions to control data transmission. This processor is set up between a host processor and a peripheral unit as an interface adapter, and is connected to each by bus means. A CRT controller, a disk controller, a printer controller, a communication interface controller, etc. are all well known for performing this function. These processors receive a command from a host processor and control the corresponding peripheral units. Some of their principal functions are data transmission, a request for and acknowledgement of data transmission, and informing a host processor and a peripheral unit of the peripheral control processor's internal status. Circuits to perform these functions are integrated on a semiconductor chip and are encapsulated in a package with a plurality of external leads, pins or other connectors through which data or commands are transferred.

Since a peripheral control processor has active control functions as mentioned above, it acts independently from a host processor. That is, a host processor and a peripheral control processor can form a multi-processing system if they are coupled to each other. A peripheral control processor acts as a master processor for a peripheral unit. Therefore, by continuously supplying a control clock signal to a conventional peripheral control processor, it is always kept on an active condition in the same manner as a host processor. However, an effective working period of a peripheral control processor is shorter than that of a host processor. Therefore, a conventional peripheral control processor consumes power unnecessarily while it is idle or in a standby condition because transistor elements on a semiconductor chip turn on and off repeatedly in response to a control clock signal in the idle time or the standby condition. These shortcomings also occur when a chip's internal circuits are constructed by a complementary insulating gate type semiconductor technology.

Further, in a semiconductor device, cost increases in proportion to the number of external leads or pins. Therefore, it is a disadvantage to add special purpose external leads or pins through which to enter control signals to reduce unnecessary power consumption.

SUMMARY OF THE INVENTION

It is an object of the present invention to provide a peripheral control processor in which unnecessary power consumption is greatly reduced without adding a special purpose external lead or pin connector.

It is another object of the present invention to provide a peripheral control processor having a simple power saving control circuit on the peripheral control processor chip.

It is still another object of the present invention to provide a control processor having transistor elements for controlling data communication in response to a control clock signal, in which the control clock signal is not applied to the transistor elements during an idle or a standby condition.

A peripheral control processor of the present invention comprises a data communication circuit having a transistor element which is activated in response to a control clock signal, a first control circuit generating a control signal to control the data communication circuit according to command signals transferred from a host processor through external terminals, and a second control circuit coupled to the external terminals for inhibiting application of the control clock signal to the transistor element according to the signal condition on the external terminals. The external terminals have a reset signal receiving terminal, a reading or a writing designation signal receiving terminal, a chip select signal receiving terminal, and a control clock signal receiving terminal for receiving the control clock signal when it is applied externally. The second control circuit produces an inhibition signal to inhibit application of the control clock signal to the transistor element in response to the reset signal, and releases the inhibition signal in response to the chip select signal and/or the reading or writing designation signal. The reset signal is usually transferred from a host processor to initialize the internal status of the peripheral control processor. The chip select signal is used to select a device from a plurality of devices. Further, the reading or writing designation signal is used to designate the data communication direction. Therefore, these signals are used in the well known peripheral control processor to execute data communication between a host processor and a peripheral unit.

The peripheral control processor of the present invention has the second control circuit to reduce unnecessary power consumption. The second control circuit operates in response to the signals which are used for another purpose in the peripheral control processor, and controls the transistor element to reduce power consumption, Since special signals are unnecessary, though the second circuit is integrated in the same semiconductor chip as the data communication circuit and the control circuit, no additional signal terminals required in the peripheral control processor package to control the second control circuit.

Since special purpose signal terminals for receiving control signals to the second control circuit are unnecessary, the present invention is compatible with a communication system, a computer system or the like. Further, the second control circuit can be provided with a flip-flop means and a gate means, so that circuit structure is very simple.

DESCRIPTION OF THE PREFERRED EMBODIMENTS

Figure 1:
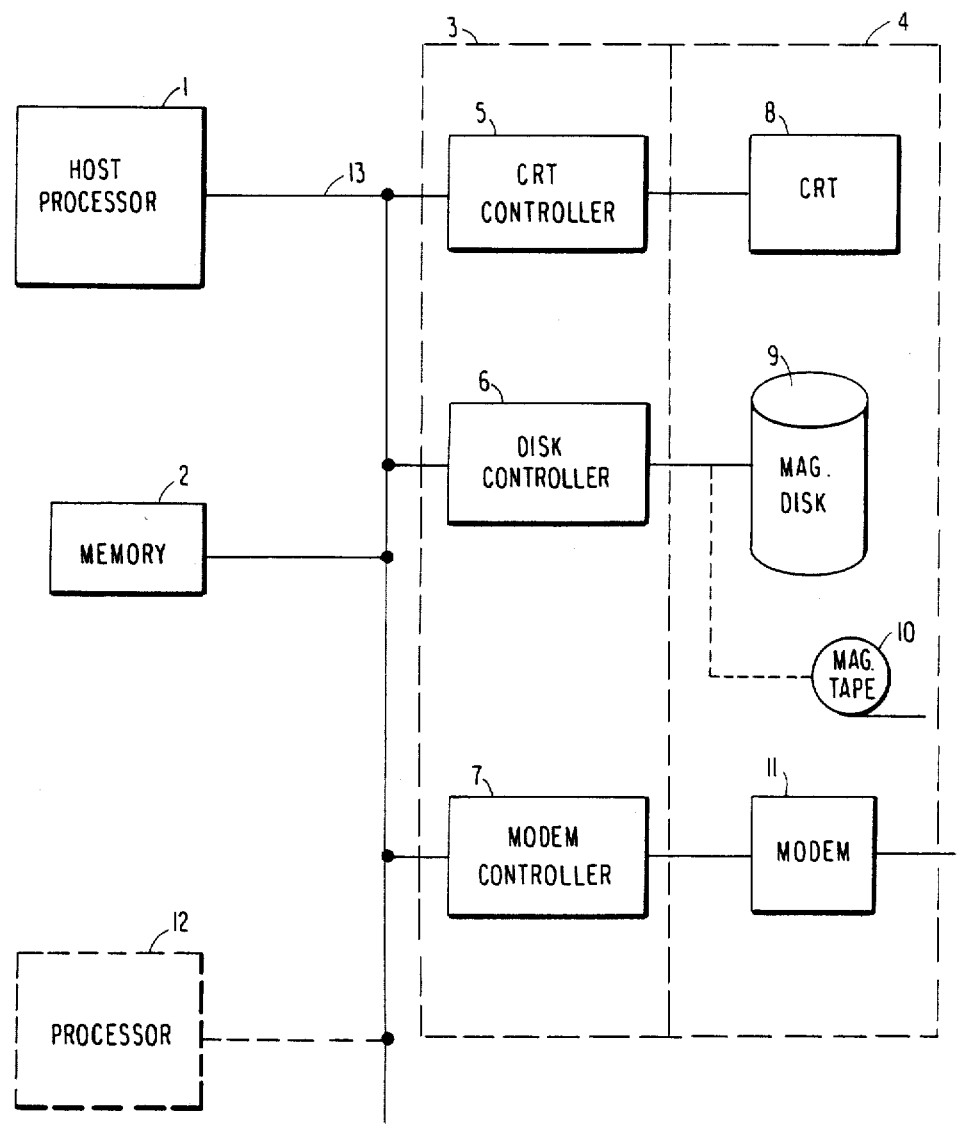
FIG. 1 shows a system block diagram of a general computer system.
Figure 2:
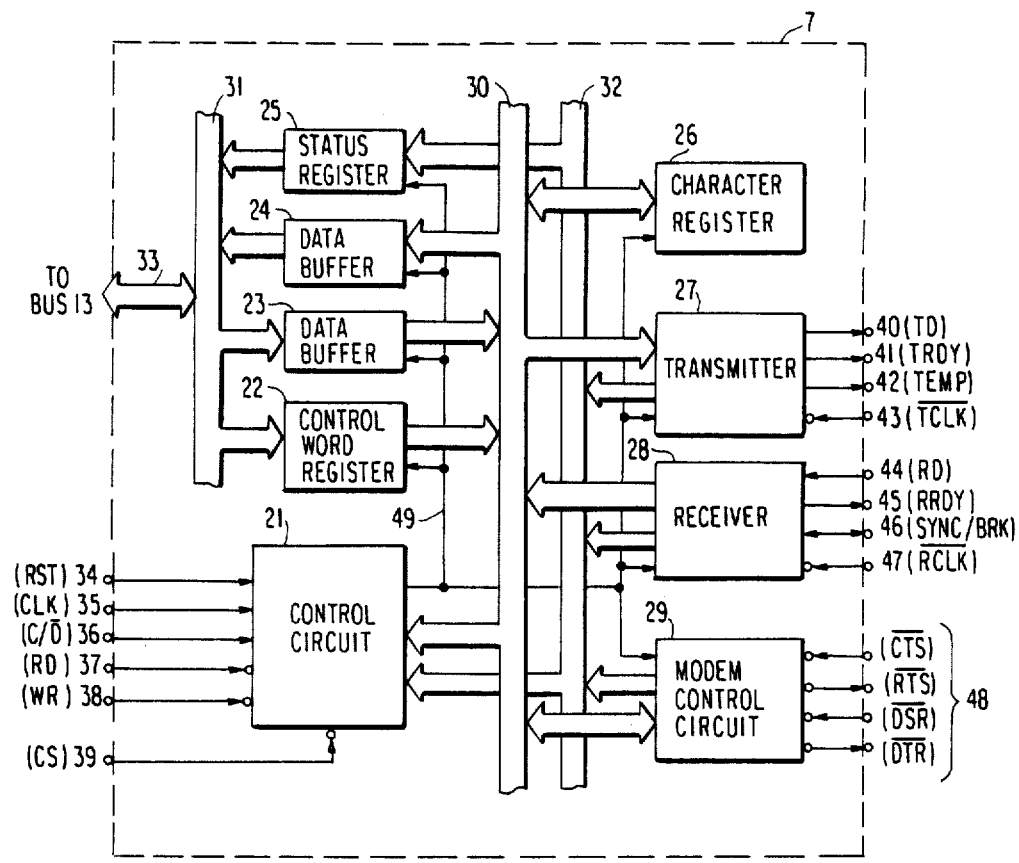
FIG. 2 shows a block diagram of the prior art peripheral control processor coupled to a modem unit.

Referring to FIG. 1, a general computer system will be described first for a better understanding of the invention. FIG. 1 is a diagram of a general computer system, in which a host processor 1 is coupled to a memory unit 2, a peripheral control section 3 and another processor 12 by an external bus 13. A peripheral section 4 includes a CRT unit 8, a magnetic disk unit 9 or a magnetic tape unit 10, and a modem unit 11. Each peripheral unit is coupled to the host processor 1 via a corresponding peripheral control processor, such as a CRT controller 5, a disk controller 6, or a modem controller 7. These peripheral control processors 5, 6 and 7 control data communication or transmission between the host processor 1 and the peripheral section 4 in response to command signals from the host processor 1 or the processor 12. For example, the modem control processor 7 circuits on a semiconductor chip as shown in FIG. 2. A control circuit 21 receives command signals (RST, C/$\overline{D}$, RD, WR and CS) and a clock signal (CLK) from the host processor 1 through external terminals 34, 36 to 39 and 35, and produces control signals 49 for controlling data communication between the host processor 1 and the modem 11. A control word register 22, a transferring data buffer 23, a receiving data buffer 24 and a status register 25 are set between a first internal bus 30 and a second internal bus 31. The second internal bus 31 is connected to a bus 33 coupled to external data terminals (not shown) which in turn are coupled to an external bus 13. The first internal bus 30 is coupled to a synchronism character register 26, a transmitter 27, a receiver 28 and a modem control circuit 29. The transmitter 27, the receiver 28 and the modem control circuit 29 are coupled to the status register 25 and the control circuit 21 by a status bus 32. The control word register 22 receives control words from the host processor 1. The transferring data buffer 23 receives data from the host processor 1 in parallel and sends them to the first internal bus 30 according to a control signal of the control circuit 21. The data of the buffer 23 is entered into the transmitter 27 and is transferred to the modem 11 in series through a terminal 40 (TD). On the other hand data from the modem 11 are serially entered into the receiver 28 through a terminal 44 (RD) and are sent in parallel to the receiving buffer 24 via the first internal bus 30. Thereafter, the data set in the buffer 24 is transferred to the host processor 1 through the bus 33 and the external bus 13. The synchronism character register 26 is used to detect the start of data. The modem control circuit 29 receives a clear to send signal ($\overline{CTS}$) and a data set-ready signal ($\overline{DSR}$) from the modem 11 and sends a request to send signal ($\overline{RTS}$) and a data terminal ready ($\overline{DTR}$) through terminals 48. The transmitter 27 and the receiver 28 include buffer means and are coupled to the host processor 1 to send TRDY, TEMP and RRDY signals and to receive and send SYNC/BRK signals.

The processor 7 starts data communication in response to the chip select signal (CS) which is transferred to the host processor 1 or the modem 11. When the reading signal (RD) is entered into the control circuit 21, the processor 7 receives data from the modem and transfers them to the host processor 1. When the writing signal (WR) is entered into the control circuit 21, the processor receives data from the host processor 1 and transfers them to the modem 11. The signal (C/$\overline{D}$) is entered to indicate that a command or data is (are) to be transferred from the host processor 1. The reset signal (RST) is entered into the control circuit to initialize buffers and registers in the processor 7 when a system is reset and when a data communication is terminated. Therefore, these signals (RST, C/$\overline{D}$, RD, WR, CS) and their terminals 34, 36 to 39 are basically necessary in order for the peripheral control processor to perform the aforementioned data communication.

Further, the control clock signal (CLK) is entered into the processor and is used as a timing signal to control operation timings of the processor.

In the prior art peripheral control processor, the control clock signal is continuously applied to the processor during the entire period when a system runs to execute an operator's program, that is, when power is supplied to the system. However, it should be noted that data communication is not always executed by the peripheral control processor. That is, often the peripheral control processor will be in an idle or standby condition. Consequently, continuous control clock signal application results in the peripheral control processor unnecessarily consuming power.

Figure 3:
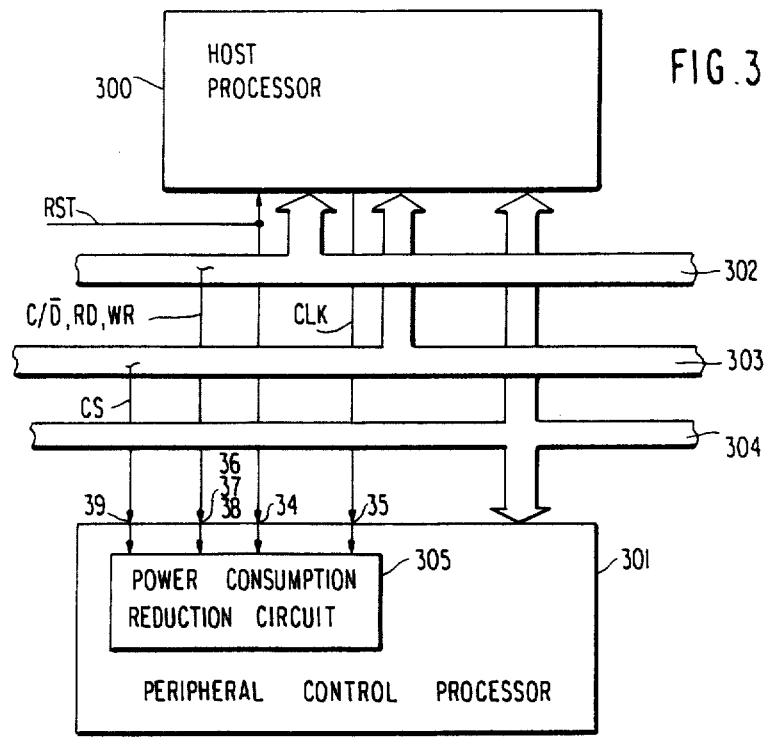
FIG. 3 shows a block diagram of an embodiment of the present invention.
Figure 4:
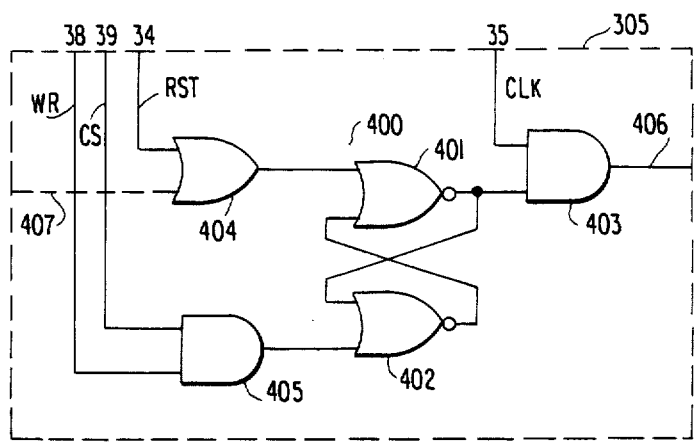
FIG. 4 shows a circuit diagram of a preferred embodiment to reduce power consumption according to the present invention.

FIG. 3 shows a host processor 300 and a peripheral control processor 301 according to an embodiment of the present invention. The host processor 300 is connected to a control bus 302, an address bus 303 and a data bus 304. These buses are shown in FIG. 1 as the external bus 13. As described above, the host processor 300 sends the reset signal (RST) to the peripheral control processor 301 and sends the C/$\overline{D}$ signal, the reading signals (RD) and the writing signals (WR) to the processor 301 through the control bus 302. Now, the reset signal (RST) may be transferred by another means. The chip select signal (CS) is transferred to the peripheral control processor 301 through the address bus 303. Further, the control clock signal (CLK) is applied to the peripheral control processor 301 which has a circuit 305 to reduce power consumption. This circuit 305 is more clearly shown in FIG. 4. The circuit 305 has a flip-flop 400 (comprising two NOR gates 401 and 402,) an AND gate 403, an OR gate 404 and an AND gate 405. The NOR gate 401 receives an output of the OR gate receiving the RST signal from the terminal 34. The NOR gate 402 receives an output of the AND gate 405 receiving the WR signal and the CS signal from the terminals 38 and 39, respectively. An input of the AND gate 405 may also receive the RD signal from terminal 37, the C/$\overline{D}$ signal from terminal 36 or the WR signal from terminal 38 via an OR gate (not shown). In FIG. 4, only the WR signal is shown as an input to the AND gate 405 to simplify the explanation of the invention. The output of the flip-flop 400 is coupled to one input of the AND gate 403 to control on and off of the AND gate 403. The AND gate 403 receives the CLK signal from the terminal 35 and sends it to an internal circuit in response to the output of the flip-flop 400.

When the RST signal is applied to the OR gate 404 from the terminal 34, the flip-flop 400 is set. As a result, the AND gate 403 is turned off, and the CLK is inhibited. If the RST signal is not applied to the OR gate 404, and the WR signal and the CS signal are applied to the AND gate 405, the flip-flop 400 is reset, then the AND gate 403 is turned on to transfer the CLK signal via terminal 406 to the internal circuit. When a reset signal indicating a data communication termination is produced by peripheral control processor 301, the signal may be applied to the circuit 305 through a dotted line 407.

Figure 5:
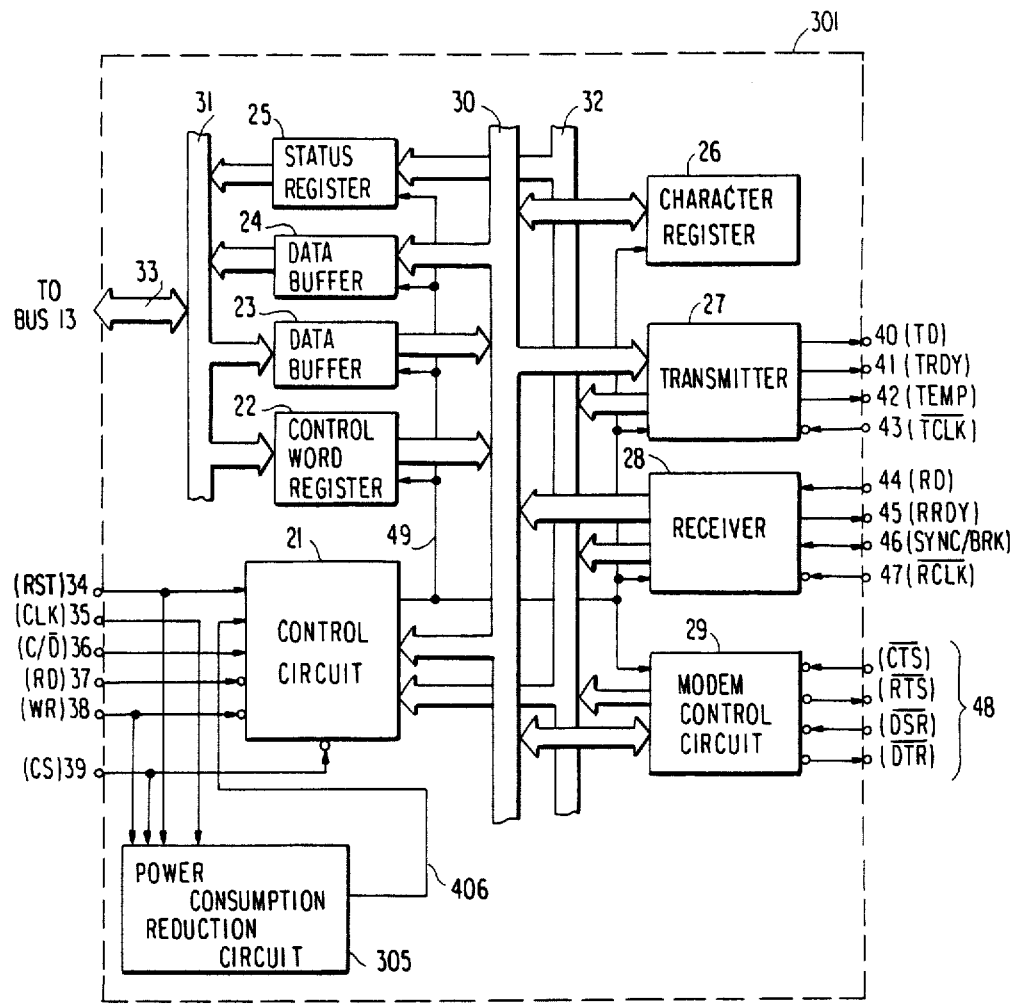
FIG. 5 shows a block diagram of the peripheral control processor of FIG. 3.

If the circuit 305 is used in the modem control processor in FIG. 2, the processor of the present invention can be constructed as shown in FIG. 5.

In FIG. 5, the circuit 305 to reduce power consumption is connected to the terminals 34, 35, 38 and 39. The operation of the peripheral control processor 301 coupled to the host processor 1 and to the modem 11 according to the present invention is as follows:

During data communication, the chip select signal (CS) is transferred from the host processor 1 to the peripheral control processor 301. When the host processor 1 sends data to the modem 11, the writing signal (WR) 38 is transferred to the peripheral control processor 301 through the terminal 38. As the result, the flip-flop 400 in FIG. 4 is reset and the control clock signal (CLK) is applied to buffers and registers.

When data communication terminates, the CS signal and the WR signal are stopped and the reset signal (RST) is applied to initialized the registers and the buffers. Thereafter the flip-flop 400 is set and the CLK is not applied to the registers and buffers. Therefore, transistor elements in response to the CLK signal are not activated until the CS signal and the WR signal are applied to the peripheral control processor 301. After data communication, then, unnecessary power consumption can be greatly reduced. Further, the circuit 305 does not require additional special purpose signals in order to control the circuit 305. Therefore, the number of terminal does not increase, as shown in FIG. 5.

Figure 6:
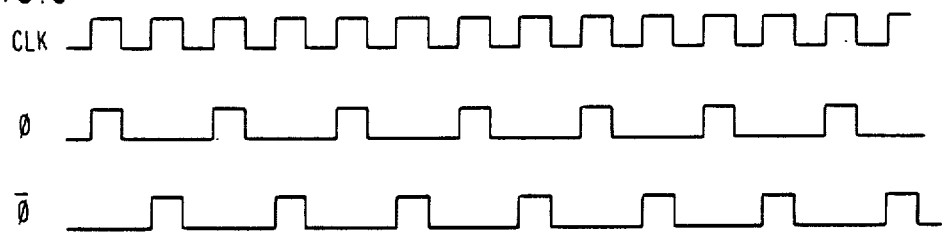
FIG. 6 shows a clock signal waveform.
Figure 7:
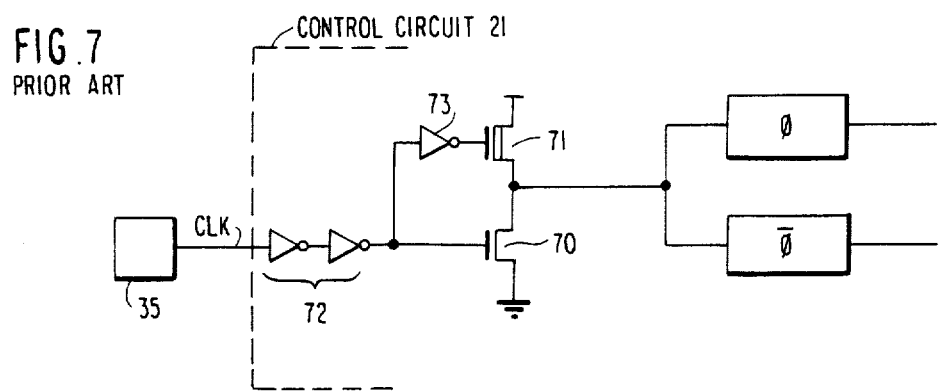
FIG. 7 shows a block diagram of a circuit to produce clock signals.

In practical use, a peripheral control processor has a clock divider to produce at least two clocks $\phi$ and $\bar\phi$ with a different phase as shown in FIG. 6. These clocks $\phi$ and $\bar\phi$ are generated by a clock divider of FIG. 7 which is a part of the circuit 21 in FIG. 2. The CLK signal received from the terminal 35 is applied to a gate of an enhancement type MOS transistor 70 through two inverters 72 acting as a buffer means, and is inverted by an inverter 73 and applied to a gate of a depletion type MOS transistor 71. These two MOS transistors are serially connected and an output is derived from a junction node. The output is supplied to a $\phi$ generator and a $\bar\phi$ generator in common.

Figure 10:
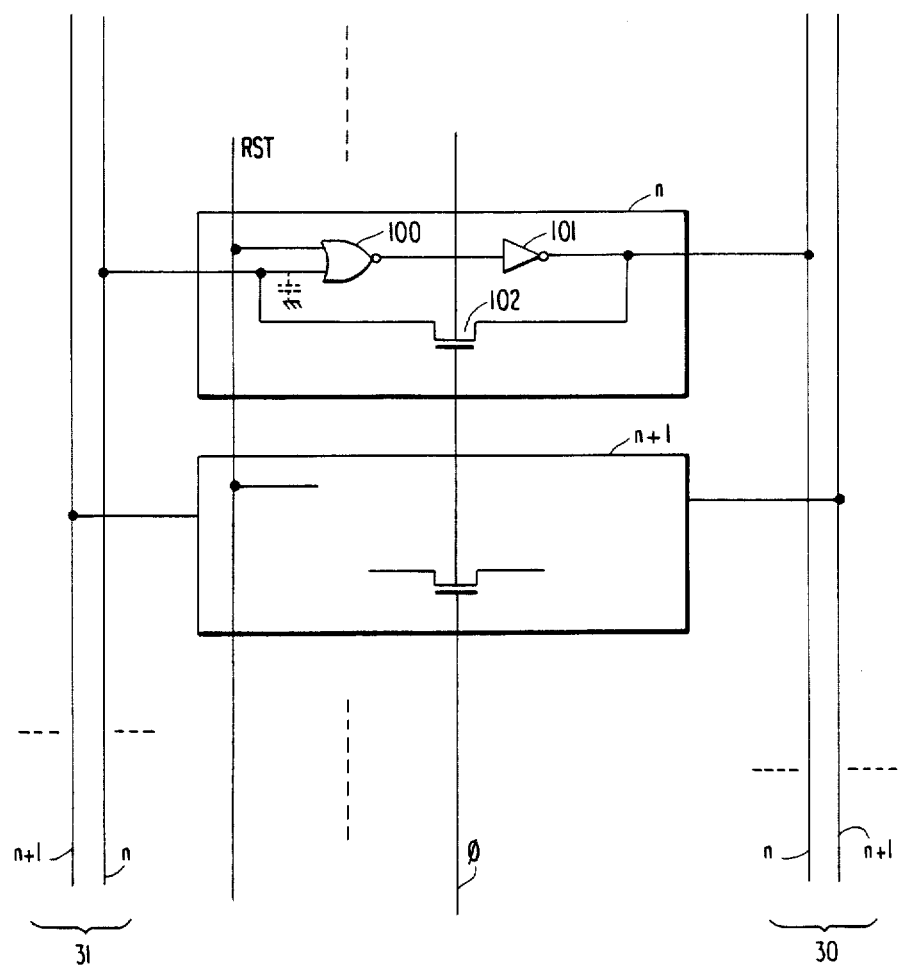
FIG. 10 is a register circuit having at least two latch circuits in a peripheral control circuit.

The produced clocks $\phi$ and $\bar\phi$ are applied to internal circuitry of the peripheral control processor 301 for timing control. For instance, the clock $\phi$ is applied to a register having a plurality of latch circuits as shown in FIG. 10. FIG. 10 shows two latch circuits n and n+1 in the control word register 22 of FIG. 5. Each latch circuit has a NOR gate 100, an inverter 101 and a transistor 102 to feed back an output of the inverter 101 to an input of the NOR gate 100. The transistor 102 is turned on by the leading edge of a pulse of the clock $\bar\phi$ and is turned off by the trailing edge of a pulse of the clock $\bar\phi$.

In idle time, if the clock $\bar\phi$ is applied to the transistor 102, an output signal of the inverter 101 is transferred to an input of the NOR gate 100 on the leading edge of a pulse of the clock $\bar\phi$, and is charged to the gate capacity of the NOR gate 100. Further, the charge of the gate capacity is discharged to ground on the trailing edge of a pulse of the clock $\bar\phi$. This charge/discharge cycle is repeated during the idle time so that power is consumed unnecessarily.

On the other hand, the circuit 305 of the present invention can inhibit the application of the clock $\bar\phi$ to the transistor 102. Therefore, the transistor 102 is not activated (is turned off) during idle time, so that the charge/discharge cycle is not repeated and is not continued. As a result, unnecessary power consumption can be markedly reduced.

Figure 8:
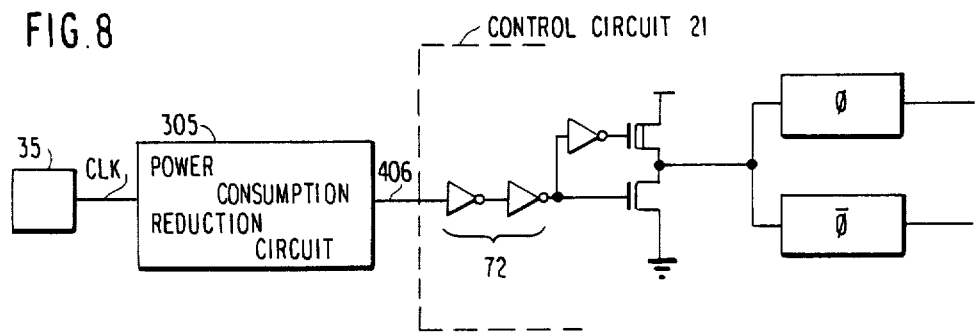
FIG. 8 and 9 are diagrams indicating examples of position of the control circuit of FIG. 4 to be set in FIG. 7.
Figure 9:
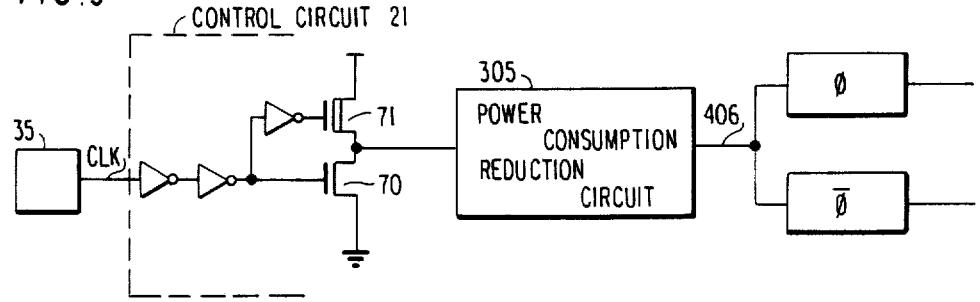

As shown in FIGS. 8 and 9, the circuit 305 is set between the terminal 35 and the inverters 72, which is the case shown in FIG. 5, or between a junction node of MOS transistors 70 and 71 and the $\phi$ and $\bar\phi$ generators. The circuit 305 may be set at any other position where a control clock signal (CLK) or $\phi$ and $\bar\phi$ can be stopped. The CLK may also be generated in the peripheral control processor 301.

Moreover, the RST signal, the WR signal and the CS signal are used as input signals of the circuit 305 in FIG. 5. However, the RD signal can be used as an input signal instead of the WR signal. Further, both the WR signal and RD signal may be applied to an input of the AND gate 405 via an OR gate.

The C/$\overline{\text{D}}$ signal can be omitted when codes to designate data and commands are added to the data to be transferred. Further, when a peripheral control processor is the only one in a system, the CS signal can also be omitted. Furthermore, when the reading operation is indicated by a high level signal and when the writing operation is indicated by a low level signal, the reading signal (RD) and the writing signal (WR) can be used in common as one signal. In this case, the input signals of the circuit 305 can be changed by arbitrary signals. However, the arbitrary signals to be used as the input signals must be applied to the circuit 305 through terminals which are used to transfer other signals necessary for data communication. Of course, the circuit 305 can be set in other peripheral control processors, i.e., the CRT controller 5, the disk controller 6, and the like.

What is claimed is:

1. A peripheral control processor for use with a host processor and a peripheral unit, said peripheral control processor receiving an external clock signal and an external reset signal, said peripheral control processor comprising:

a first terminal for receiving said external clock signal;

a second terminal for receiving said external reset signal to initialize said peripheral control processor;

a third terminal for receiving a chip select signal;

a fourth terminal for receiving a reading signal or a writing signal;

a data communication circuit, coupled to said first to fourth terminals, for transferring data between said host processor and said peripheral unit on the basis of timing control by said external clock signal, said data communication circuit being enabled by said chip select signal and initialized by said external reset signal, said data communication circuit transferring said data from said host processor to said peripheral unit in response to said writing signal and from said peripheral unit to said host processor in response to said reading signal; and a control circuit coupled between said first terminal and said data communication unit and connected to said second, third and fourth terminals, said control circuit permitting said external clock signal to be supplied to said data communication circuit when both of said chip select signal and said reading signal or said writing signal are received, and inhibiting application of said external clock signal to said data communication circuit when said external reset signal is received, wherein said data communication circuit it initialized and power consumption of said data communication circuit is reduced in response to said external reset signal.

2. A peripheral control processor as claimed in claim 1, wherein said data communication circuit includes a plurality of latch circuits driven by said clock signal.

3. A peripheral control processor as claimed in claim 1, wherein said control circuit includes a flip-flop circuit which is set by said reset signal and reset by said chip select signal and said reading signal or said writing signal, and a gate circuit receiving said clock signal and an output of said flip-flop circuit.

4. A peripheral control processor as claimed in claim 1, wherein said data communication circuit, said first control circuit and said second control circuit are integrated on a semiconductor chip.

5. A peripheral control processor receiving an external clock signal, said peripheral control processor comprising:
 first means for transferring data from a host processor to a peripheral unit;
 second means for receiving said external clock signal from said host processor;
 third means for receiving first and second command signals supplied by said host processor, wherein said first command signal indicates a start of a data transfer and said second command signal indicates initialization of said peripheral control processor;
 fourth means, coupled to said first and third means, for controlling said first means to enable the data transfer in response to said first command signal, and to reset said first means in response to said second command signal; and
 fifth means, coupled to said first, second, and third means for applying said external clock signal to said first means in response to said first command signal and for inhibiting application of said external clock signal to said first means in response to said second command signal, wherein said first means is reset and power consumption of said first means is reduced in response to said second command signal.

6. A peripheral control processor comprising:
 a data communication circuit for transferring data between a host processor and a peripheral unit on the basis of timing control by a clock signal received from said host processor;
 a first control circuit coupled to said data communication circuit and generating a control signal to activate said data communication circuit in response to a plurality of signals received from the host processor;
 means for applying said clock signal to said data communication circuit;
 means responsive to a reset signal received from said host processor for initializing said data communication circuit; and a second control circuit, coupled to said clock signal applying means and said reset signal responsive means, for generating an inhibition signal to inhibit application of said clock signal to said data communication circuit when said reset signal is received, wherein said data communication circuit is reset and power consumption in said data communication circuit is reduced in response to said reset signal.

7. A peripheral control processor for use with a host processor and a peripheral unit, said peripheral control processor receiving an external clock signal and an external reset signal, said peripheral control processor comprising:
 a first terminal for receiving said external clock signal;
 a second terminal for receiving said external reset signal;
 a third terminal for receiving a chip select signal from said host processor;
 a fourth terminal for receiving a reading signal or a writing signal from said host processor;
 a data communication circuit, coupled to said first to fourth terminals, for transferring data between said host processor and said peripheral unit on the basis of timing control by said clock signal, said data communication circuit being enabled by said chip select signal and initialized by said reset signal, said data communication circuit transferring said data from said host processor to said peripheral unit in response to said writing signal and from said peripheral unit to said host processor in response to said reading signal; and
 a control circuit coupled between said first terminal and said data communication circuit and connected to said second, third and fourth terminals, said control circuit permitting said clock signal to be supplied to said data communication circuit when both of said chip select signal and said reading signal or said writing signal are received, and inhibiting application of said clock signal to said data communication circuit when said reset signal is received;
 said control circuit including a first logic gate receiving said chip select signal and said reading signal or writing signal to produce a first control signal when said chip select signal and said reading signal or said writing signal are received, a flip-flop circuit having first and second states, means responsive to said reset signal for placing said flip-flop in said first state, means responsive to said first control signal for placing said flip-flop in said second state, and a second logic gate receiving said clock signal and coupled to an output of said flip-flop for transferring said clock signal to said data communication circuit in response to said second state of said flip-flop, and for inhibiting said external clock signal from being transferred to said data communication circuit in response to said first state of said flip-flop.

8. A peripheral control processor as claimed in claim 7, wherein said first logic gate is an AND gate.

9. A peripheral control processor as claimed in claim 7, wherein said second logic gate is an AND gate.

* * * * *

UNITED STATES PATENT AND TRADEMARK OFFICE
CERTIFICATE OF CORRECTION

PATENT NO. : 4,841,440

DATED : June 20, 1989

INVENTOR(S) : Kazuya Yonezu et al

It is certified that error appears in the above-identified patent and that said Letters Patent is hereby corrected as shown below:

Column 5, line 39, delete "$\phi$ and $\phi$" and insert -- $\phi$ and $\bar{\phi}$ -- line 41, delete "$\phi$ and $\phi$" and insert -- $\phi$ and $\bar{\phi}$ -- line 50, delete "$\phi$" and insert -- $\bar{\phi}$ -- line 51, delete "$\phi$ and $\phi$" and insert -- $\phi$ and $\bar{\phi}$ --

Column 6, line 13, delete "$\phi$ and $\phi$" and insert -- $\phi$ and $\bar{\phi}$ -- line 15, delete "$\phi$ and $\phi$" and insert -- $\phi$ and $\bar{\phi}$ --

Signed and Sealed this

Twenty-eighth Day of August, 1990

Attest:

HARRY F. MANBECK, JR.

*Attesting Officer*  *Commissioner of Patents and Trademarks*